(12) United States Patent
Gorgol et al.

(10) Patent No.: US 6,273,081 B1
(45) Date of Patent: Aug. 14, 2001

(54) PORTABLE GASOLINE MASONRY SAW WITH DUST REMOVAL SYSTEM

(76) Inventors: Paul Gorgol; William R Harding, both of 100 Thomas Johnson Dr., Frederick, MD (US) 21702

( * ) Notice: Subject to any disclaimer, the term of this patent is extended or adjusted under 35 U.S.C. 154(b) by 0 days.

(21) Appl. No.: 09/227,157

(22) Filed: Jan. 8, 1999

(51) Int. Cl.[7] .................................................. B28D 1/04
(52) U.S. Cl. ........................ 125/13.01; 125/35; 125/38
(58) Field of Search .................................. 125/12, 13.01, 125/35, 38; 83/471.2, 437.1, 372, 698.11, 886

(56) References Cited

U.S. PATENT DOCUMENTS

| | | |
|---|---|---|
| 1,139,636 | 5/1915 | Calhoun . |
| 2,353,264 | 7/1944 | Piland . |
| 2,371,401 | 3/1945 | Martin . |
| 2,455,113 * | 11/1948 | Coates . |
| 2,726,651 * | 12/1955 | Tucker . |
| 3,635,206 * | 1/1972 | Harclerode . |
| 4,398,737 | 8/1983 | Harding . |
| 4,428,159 * | 1/1984 | Sigetich et al. . |
| 4,446,845 | 5/1984 | Harding . |
| 4,620,712 | 11/1986 | Blackwell . |
| 4,705,283 | 11/1987 | Kleisath . |
| 5,127,391 * | 7/1992 | O'Keefe ............................ 125/13.01 |
| 5,322,307 | 6/1994 | Tilton et al. . |
| 5,676,124 | 10/1997 | Lee . |
| 5,709,397 | 1/1998 | Hall . |
| 5,746,193 * | 5/1998 | Swan .................................. 125/13.03 |
| 6,000,387 * | 12/1999 | Lee .................................... 125/13.01 |
| 6,067,977 * | 5/2000 | Wark et al. ................... 125/13.01 X |
| 6,080,041 * | 6/2000 | Greenland ..................... 125/13.01 X |

* cited by examiner

Primary Examiner—Timothy V. Eley

(57) ABSTRACT

A portable masonry saw comprises an upper frame assembly; a lower frame assembly secured to the upper frame assembly; a gasoline engine for driving a cutting blade of the saw, secured to a mounting deck; connected to the upper frame assembly; resilient supports on the bottom of the lower frame assembly for securely supporting the saw on the floor of a work area in a stationary position during a cutting operation; a plurality of wheels on the bottom of the lower frame assembly for transporting the apparatus when it is tilted to a and a transport position. The combined vertical height of the upper and lower frame assemblies is such that an operator may readily operate the saw to cut masonry materials and transport the saw on the wheels from a kneeling position. Resilient, vibration damping material is also provided between the upper frame assembly and the mounting deck to facilitate cleaner cuts. Two embodiments of a dust removal system are disclosed and include a dust pan with an upwardly facing concavity and a coupling to a supply of water. In the alternative, the dust collection system comprises an elongated conduit disposed longitudinally of the direction of cutting with an upwardly facing slot therein for directing dust created by the cuts into the conduit and on to an associated dust collection device. In a preferred embodiment the wheels and the resilient feet on the bottom of the apparatus are provided on a separate transportable cart which is readily attachable and detachably from the lower frame assembly of the saw.

31 Claims, 5 Drawing Sheets

PORTABLE GASOLINE MASONRY SAW WITH DUST REMOVAL SYSTEM

BACKGROUND OF THE INVENTION

The present invention relates to a portable masonry saw for cutting ceramic tile, brick and paver blocks. More specifically, the present invention relates to a gasoline powered masonry saw removably mounted on a low profile hand cart in order to facilitate easy transport of the saw to and from the work site as well as during the work in progress.

Heretofore, masonry saws with gasoline power have been heavy, bulky and difficult to transport. In order to be moved to and from the work site, or during the work task being performed, required the operator to stand, lift, and carry the saw or place the saw on some type of separate hand truck assembly. This was particularly inconvenient when moving the saw during the performance of the work task, such as when cutting and assembling a plurality of pavers to form a driveway or the like.

State of the art gasoline powered masonry saws are also prone to vibrations which are detrimental to achieving a clean cut of the masonry, since the supporting surface is rigid and hard.

In addition, dust removal systems for state of the art masonry saws have been less than adequate in terms of design, compactness and portability.

Accordingly, a need in the art exists for a portable masonry saw overcoming the above deficiencies of state of the art saws.

SUMMARY OF THE INVENTION

Accordingly, it is a primary object of the present invention to provide a small, portable gasoline masonry saw which may disassemble into two pieces for easy transport, and is mountable to a low profile cart for transport to and from a work area.

It is another object of the present invention to provide a portable gasoline powered masonry saw which is movable by an operator from a kneeling position so the operator can mark, cut and install materials such as pavers without getting up and down as the work progresses.

It is a further object of the present invention to provide a gasoline or electric powered masonry saw with improved vibration damping support structure.

It is yet another object of the present invention to provide a gasoline or electric powered masonry saw with a limited number of moving parts to avoid alignment problems of the respective components.

It is still a further object of the present invention to provide a gasoline or electric powered masonry saw which is safe, stable and untippable even when cutting unusually heavy work pieces.

It is still a further object of the present invention to provide a gasoline powered masonry saw with an improved dust removal system which is compact, lightweight and highly efficient.

The objects of the present invention are fulfilled by providing a portable masonry saw apparatus comprising:
an upper frame assembly;
a lower frame assembly secured to the upper frame assembly;
an engine mounting deck secured to the upper frame assembly;
an engine for driving a cutting blade of the saw; secured to the mounting deck;
support means on the bottom of the lower frame assembly for securely supporting the apparatus on the floor of a work area in a stationary position during a cutting operation of the saw;
wheel means secured to the bottom of the lower frame assembly for transporting the apparatus, said wheel means being disposed in a raised position above the floor when the support means engages the floor, and engaging the floor when the support means is moved out of engagement with the floor; and
the combined vertical height of the upper and lower frame assemblies being such that an operator may readily operate the saw to cut masonry materials and transport the saw on the wheel means from a kneeling position.

In a preferred embodiment the support means and wheel means are part of a separate portable hand cart assembly which is easily attachable to the frame assemblies of the saw.

The masonry saw apparatus includes vibration damping material disposed between the engine deck and the upper frame assembly; as well as vibration damping material between the bottom of the hand cart and the floor.

The portable masonry saw includes a frame assembly; a mounting deck; and an arbor for the cutting blade disposed in relatively fixed position. The only major moving part is a cutting tray for supporting the material to be cut. The cutting tray is supported for relative movement with respect to the arbor and the cutting blade longitudinally of a cutting direction.

In a preferred embodiment, a dust removal assembly is provided which includes conduit means extending along the cutting path having a longitudinal slot through a top wall thereof for receiving dust from cutting of the work piece; and suction means connected to the conduit means for drawing the dust through the conduit to a dust collection device. The slot in the top of the conduit means communicates with an aligned slot in the cutting tray for supporting the work piece so that dust resulting from a cut is drawn through the respective slots into the conduit and into the dust collection device.

In another embodiment, the dust collection device comprises a dust pan with an upwardly facing concavity which may be connected to a source of water to fill the concavity with water and absorb any dust created in this fashion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
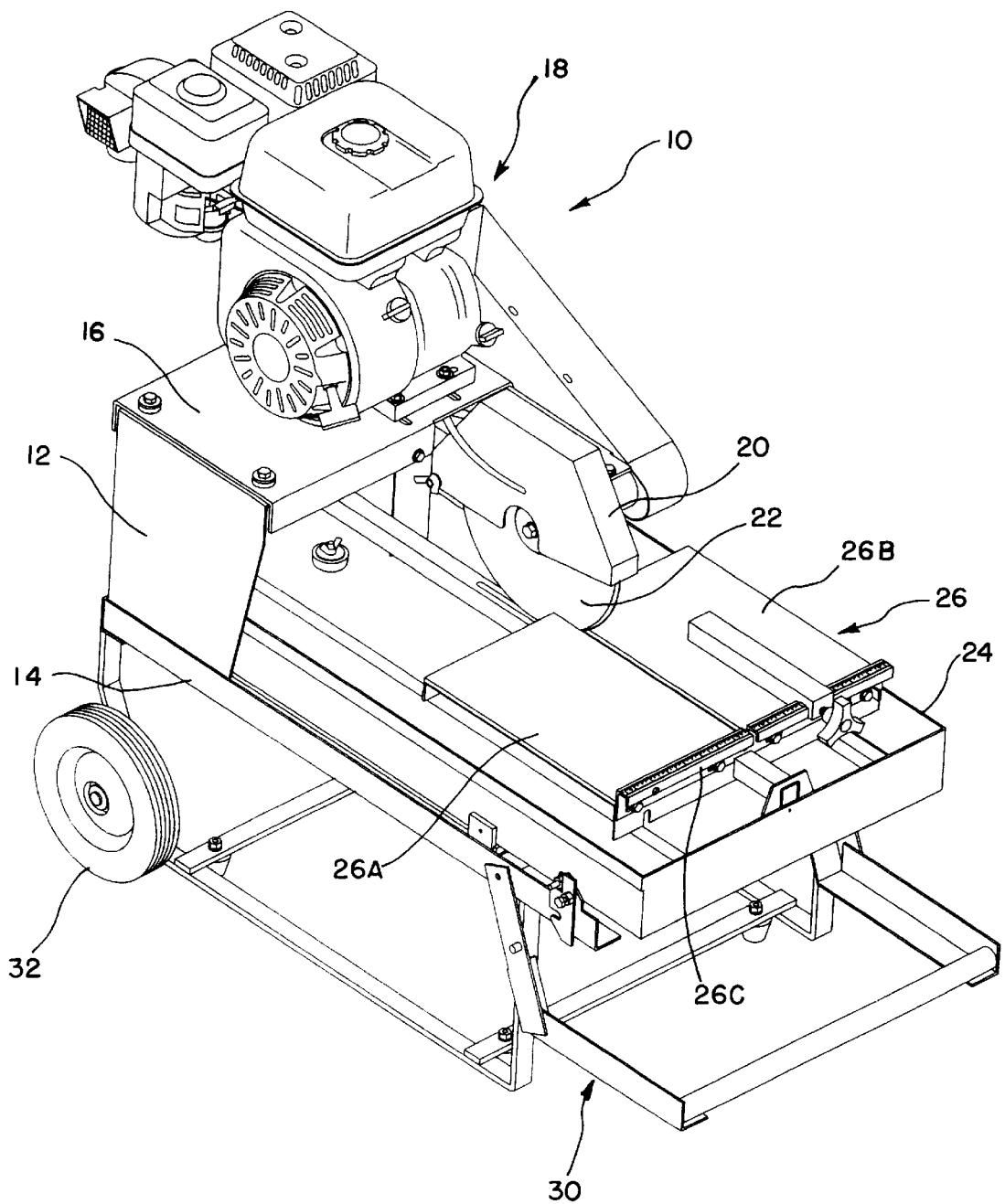
FIG. 1 is a left, front perspective view of a portable gasoline powered masonry saw in accordance with a preferred embodiment of the present invention.

Referring to FIG. 1, there is illustrated a gasoline powered masonry saw of the present invention generally indicated 10. The saw includes a gasoline engine 18, an arbor 20, a cutting blade 22, a dust collection pan 24 and a cutting tray 26. The frame assembly of the cart includes an upper frame assembly 12 including two vertical side panels coupled between an engine mounting deck 16 and a lower frame assembly 14. The entire masonry saw assembly is detachably connected to a portable hand cart assembly 30.

Figure 2:
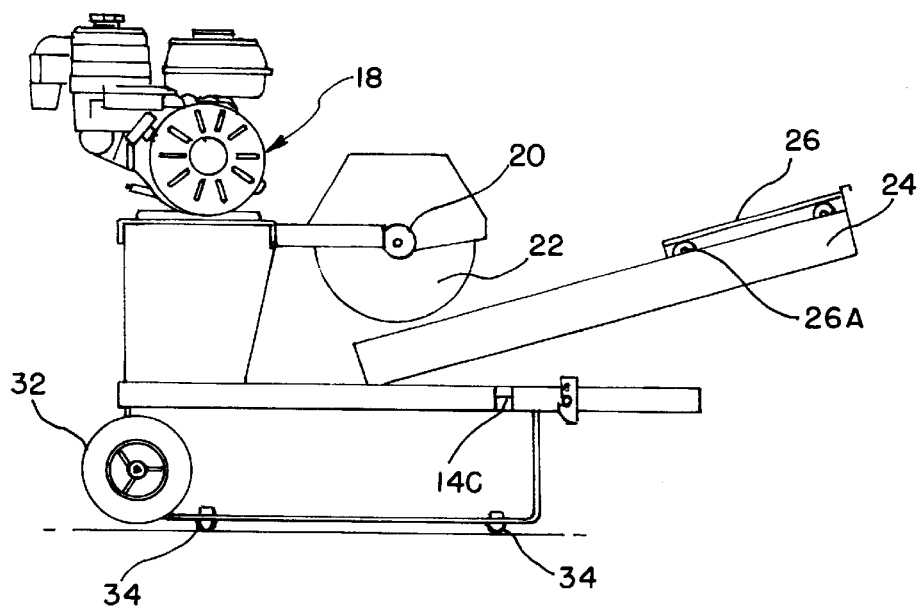
FIG. 2 is a side elevational view of the masonry saw of FIG. 1 depicting the removability of a dust collection pan thereof from the rest of the assembly.

FIG. 2, depicts in side elevation how the dust pan 24 can be removed from the lower frame assembly 14, and how the lower frame 14 can be detached from the cart 30 by means of a safety bolt 14C. Bolt 14C is only accessible when pan 24 is tipped, as shown.

Figure 3:
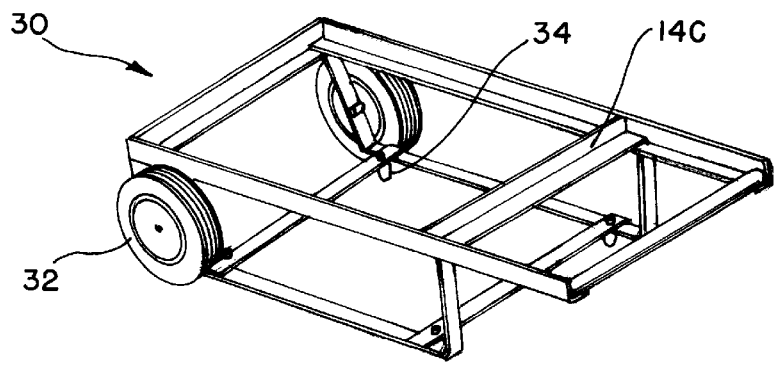
FIG. 3 is a left, front perspective view illustrating the portable hand cart assembly of the masonry saw of FIG. 1.

FIG. 2 also illustrates in conjunction with FIG. 3 the details of the part 30 which includes a substantially rectangular frame assembly having wheels 32 at a rear end thereof journaled into the sides of the frame. Wheels 32 are in an elevated position out of contact with the floor when the cart 30 is resting on the floor in a horizontal cutting position. While in this position, the cart rests on resilient feet 34 fabricated from material which damping the vibration between the frame of the saw and the hard support surface or floor on which it rests. However, when it is desired to move the saw during a work in progress from a kneeling position, the cart may simply be tilted onto wheels 32 to lift the resilient feet 34 out of engagement with the floor, and the entire saw assembly can be easily rolled to the next position as the operator moves along the floor, such as a paver surface being assembled.

Vibration damping material is also provided between the upper side frames 12 and the engine mounting deck 16 in order to further decrease engine vibration being transferred to the cutting blade 22.

Figure 4:
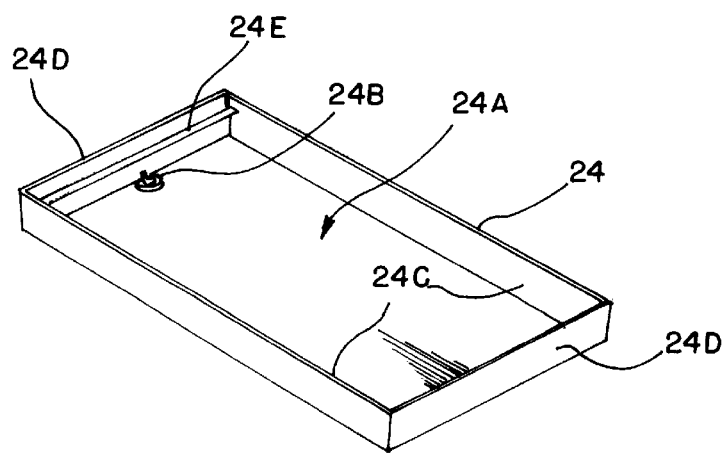
FIG. 4 is a perspective view of the dust pan of the masonry saw of the present invention.

Referring to FIG. 4, the structure of the dust pan 24 is illustrated as including an upwardly facing concavity 24A, a pair of side walls 24C which function as tracks for engaging wheels 26A of cutting tray 26, end walls 24D, stop bar 24E and a water supply coupling 24B. In one embodiment of the present invention the removal of dust is accomplished by filling the concavity 24A of dust pan 24 with water through coupling 24B. The water absorbs a substantial amount of the dust from the cutting operation. However, a preferred embodiment of a dust removal system will be described more fully hereinafter with reference to FIGS. 6 to 8.

Figure 5:
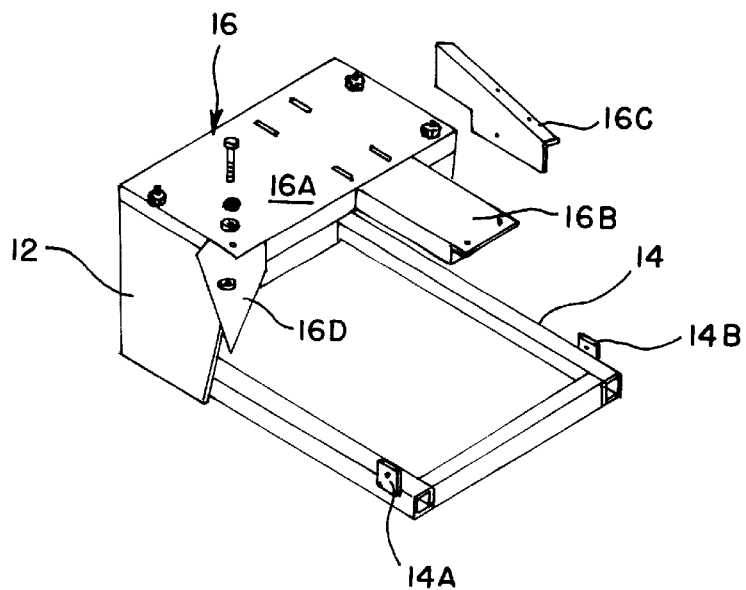
FIG. 5 is a perspective view of the upper and lower frame assemblies of masonry saw of the present invention and the engine and arbor decks.

FIG. 5 depicts details of the frame assembly of the masonry saw of the present invention. An upper frame assembly including upstanding side panels 12 is provided and is secured between an engine mounting deck assembly 16 and lower frame 14. Deck assembly 16 includes an engine mounting portion 16A and an arbor mounting portion 16B extending from the front edge thereof. Adjustable wings 16C and 16D are provided in order to restrain the cutting tray from tipping even when cutting unusually heavy work pieces.

As illustrated in FIGS. 1 and 2 the cutting tray 26 has four rollers 26A, two on each respective side edge, which roll along tracks in dust pan 24. Thus, these rollers 26A facilitate the longitudinal movement of cutting tray 26 longitudinally of the cutting path in order to move the work piece being cut into and beyond the cutting blade 22.

It can be seen that there are a minimum of movable parts involved in the cutting operation since the engine deck, frame assembly, and arbor are fixed relative to each other and only the cutting tray is relatively moved during a cutting operation. This minimizes the potential of having the parts improperly adjusted to become out of alignment when used by unskilled operators.

Figure 6:
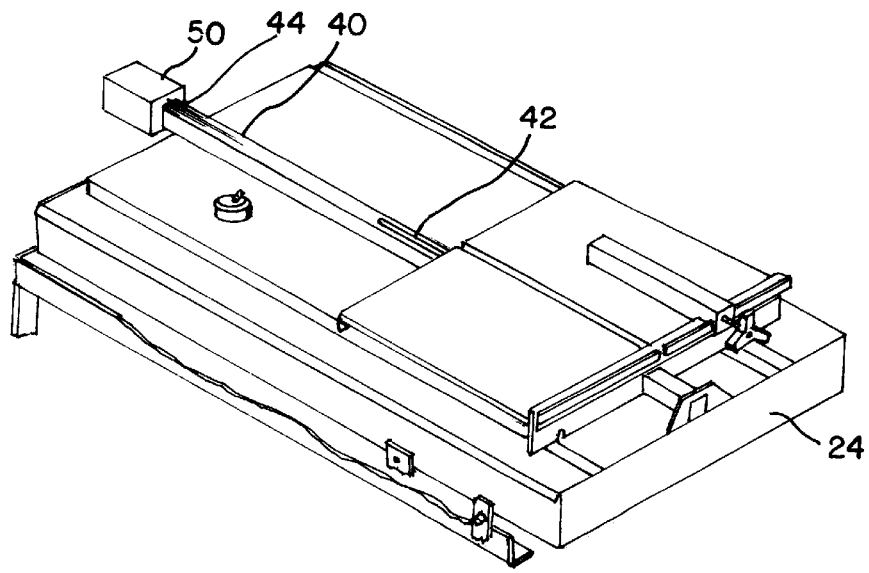
FIG. 6 is a perspective view of a preferred dust removal system of the present invention.
Figure 7:
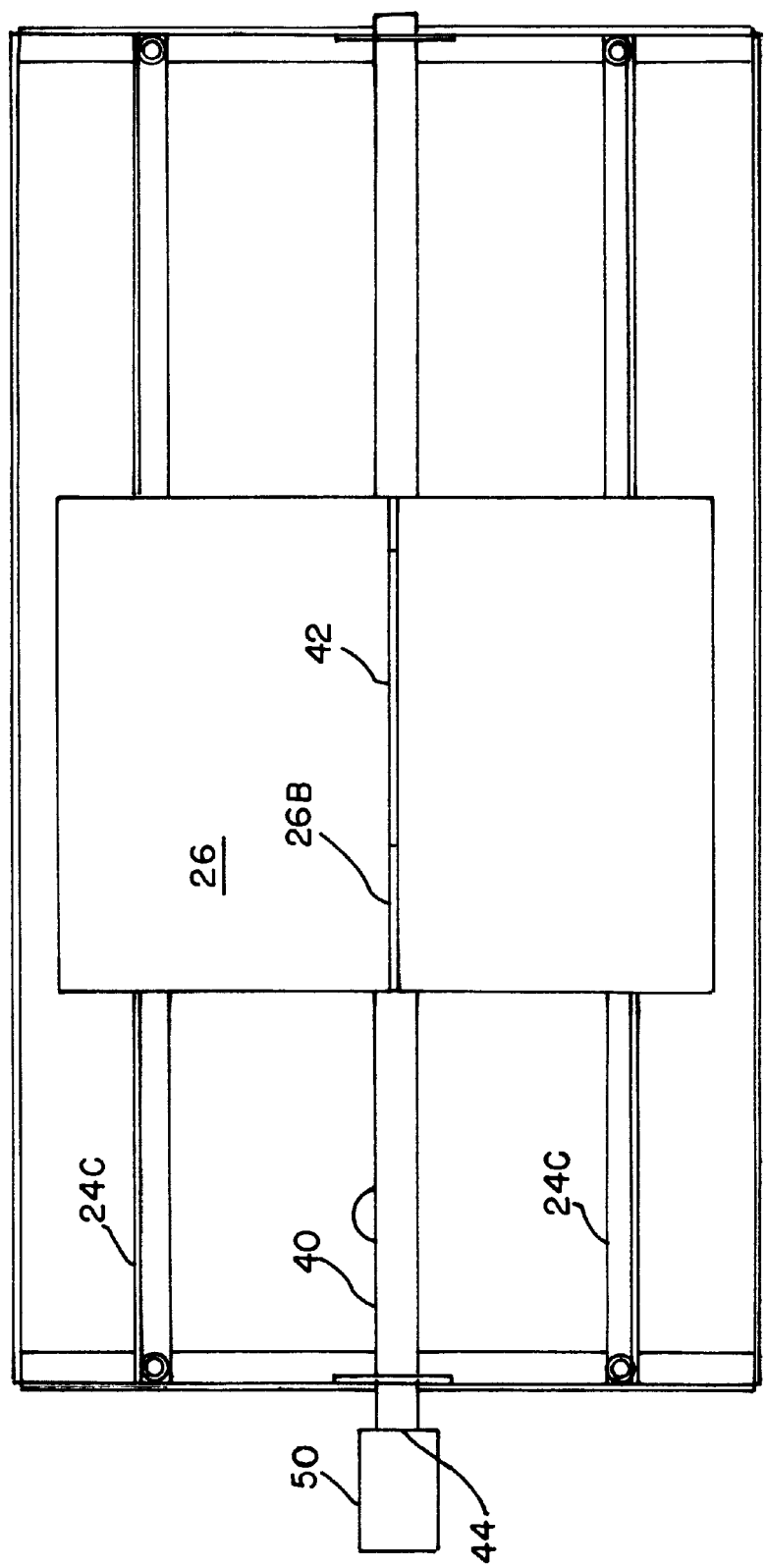
FIG. 7 is a left, front perspective view of a dust removal conduit for use in the dust removal assembly of FIG. 6.
Figure 8:
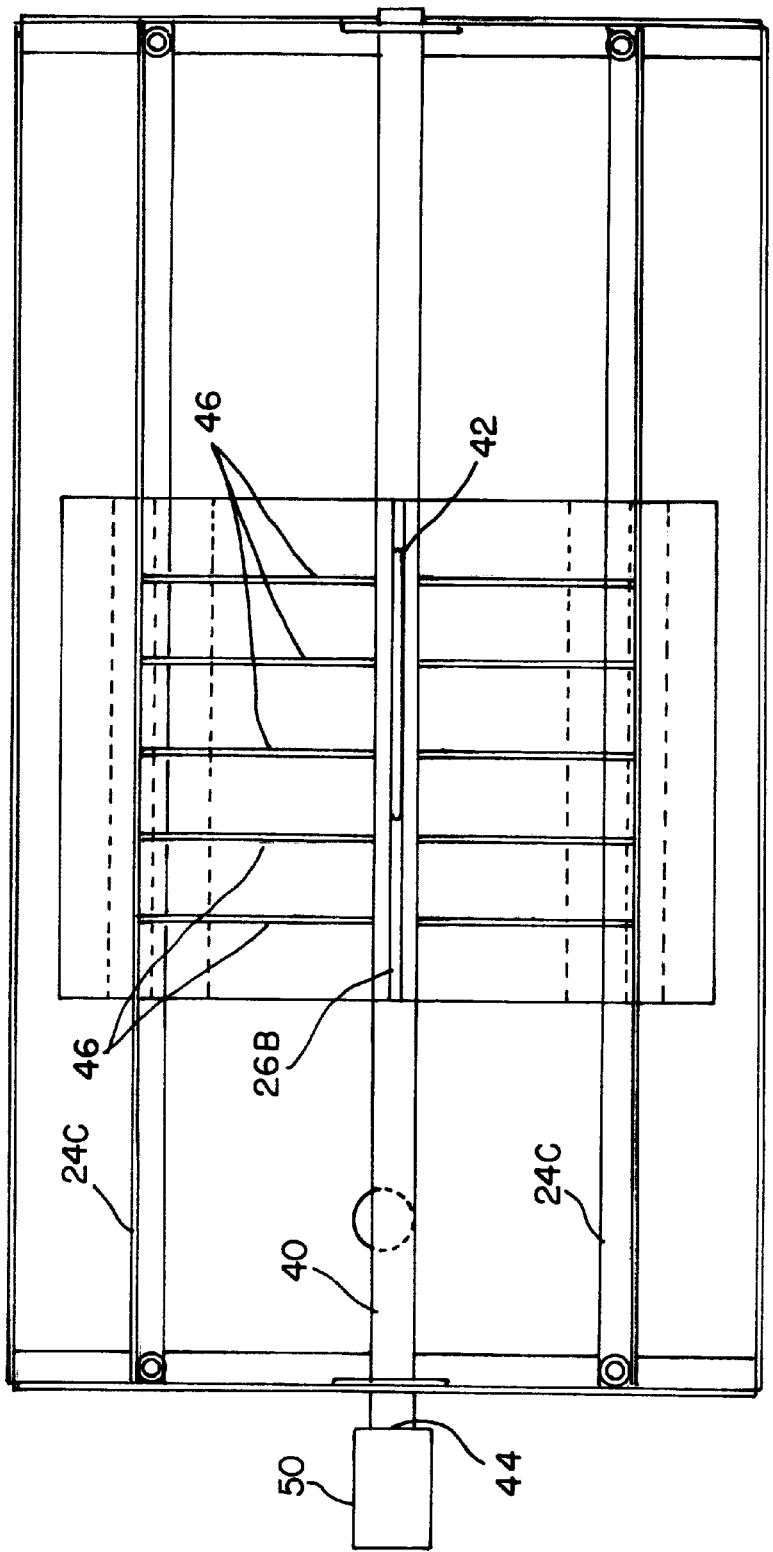
FIG. 8 is a bottom plan view of the cutting tray for the masonry saw of the present invention illustrating a plurality of baffles for channeling dust to the dust removal conduit of FIG. 7.

Referring to FIGS. 6 to 8, there is depicted a preferred embodiment of a dust removal system of the present invention. A dust removal conduit 40 is provided which runs along substantially the entire length of the dust collection pan 24. Conduit 40 has a longitudinally slot 42 in the top surface thereof which is substantially coextensive with the cutting path. A coupling 44 is provided at the rear of the conduit in order to attach the conduit to a vacuum source for drawing dust through the conduit to a dust collection device 50. The slot in the top wall of the dust collection conduit 40 is aligned with a slot 26B in the center of the cutting tray 26. As illustrated in FIG. 8, the bottom of the cutting tray 26 is provided with a plurality of baffles 46 which define channels therebetween in communication with the slot 42 in the conduit 40 and the slot 26B in the cutting tray.

In operation it can be seen that as a cut is being made while the cutting tray 26 is moved along the cutting path any resulting dust is drawn through slots 26B and 42 into the conduit 40, and sucked into a dust collection device by the vacuum source. The baffles 46 on the bottom of the cutting tray 26 help to further draw in dust from the pan 24 which was not drawn through the cooperating slots 26B and 42.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A portable masonry saw apparatus comprising
an upper frame assembly,
a lower frame assembly secured to the upper frame assembly;
an engine for driving a cutting blade of the Dortable masonry saw apparatus secured to a mounting deck connected to the upper frame assembly;
support means on the bottom of the lower frame assembly for securely supporting the apparatus on a substantially planar floor of a work area in a stationary position during a cutting operation of the saw;
wheel means secured to the bottom of the lower frame assembly for transporting the apparatus, said wheel means being disposed in a raised position above the planar floor when the support means engages the planar floor and engaging the planar floor when the support means is moved out of engagement with the planar floor; and the combined vertical height of the upper and lower frame assemblies being such that an operator may readily operate the saw to cut masonry materials and transport the saw on the wheel means from a kneeling or sitting position with the operation on the planar floor.

2. The apparatus of claim 1, further including vibration damping material disposed between the deck and the upper frame assembly.

3. The apparatus of claim 2, wherein the support means includes vibration damping material for engaging the floor.

4. The apparatus of claims 2 further including a dust pan detachably connected to the lower frame assembly, said dust pan having an upwardly facing dust collecting concavity.

5. The apparatus of claim 4 further including a cutting tray for supporting masonry materials to be cut, said cutting tray being supported in said dust pan for relative movement with respect to the cutting blade longitudinally of a cutting direction.

6. The apparatus of claim 1, wherein the support means includes vibration damping material for engaging the floor.

7. The apparatus of claim 6, further including a dust pan detachably connected to the lower frame assembly, said dust pan having an upwardly facing dust collecting concavity.

8. The apparatus of claim 7, further including water supply means for supplying water to the dust collecting concavity.

9. The apparatus of claim 7 further including a cutting tray for supporting masonry materials to be cut, said cutting tray being supported in said dust pan for relative movement with respect to the cutting blade longitudinally of a cutting direction.

10. The apparatus of claim 1 further including a cutting tray for supporting masonry materials to be cut, said cutting tray being supported for relative movement with respect to the cutting blade longitudinally of a cutting direction.

11. The apparatus of claim 10, wherein said support means and wheel means are part of a cart assembly, said cart assembly being detachably secured to the lower frame assembly.

12. The apparatus of claim 10 further including adjustable locking wings extending from the upper frame assembly at the rear end of the lower frame assembly for retaining the cutting tray from tipping.

13. The apparatus of claim 1 wherein said support means and wheel means are part of a cart assembly, said cart assembly being detachably secured to the lower frame assembly.

14. A dust removal assembly for the masonry saw of claim 1 comprising:
workpiece support means;
a blade support for positioning a cutting blade in a longitudinal cutting path;
conduit means extending along the cutting path having a longitudinal slot through a top wall thereof for receiving dust from cutting of the workpiece; and
suction means connected to the conduit means for drawing the dust through the conduit to a dust collection device.

15. The assembly of claim 14 further including a cutting tray for the workpiece mounted for relative movement with respect to the blade support along the cutting path.

16. The assembly of claim 15, wherein said cutting tray includes a longitudinal slot aligned with the slot in the conduit means.

17. The assembly of claim 16, wherein the blade support is stationary and the cutting tray is movable.

18. The assembly of claim 14 wherein said cutting tray has baffles on the underside thereof, said baffles defining transverse chambers in communication with the slot in the conduit means.

19. The assembly of claim 14 wherein said saw is a masonry saw.

20. A portable masonry saw apparatus comprising:
an upper frame assembly;
a lower frame assembly secured to the upper frame assembly;
an engine for driving a cutting blade of the portable masonry saw apparatus secured to a mounting deck connected to the upper frame assembly;
support means on the bottom of the lower frame assembly for securely supporting the apparatus on planar floor of a work area in a stationary position during a cutting operation of the saw;
wheel means secured to the bottom of the lower frame assembly for transporting the apparatus, said wheel means being disposed in a raised position above the planar floor when the support means engages the planar floor and engaging the planar floor when the support means is moved out of engagement with the Planar floor; and
a first vibration damping material disposed between the deck and the upper frame assembly; and
a second vibration damping material on the support means for engaging the planar floor.

21. The apparatus of claim 20, further including a dust pan detachably connected to the lower frame assembly, said dust pan having an upwardly facing dust collecting concavity.

22. The apparatus of claim 21, further including water supply means for supplying water to the dust collecting concavity.

23. The apparatus of claim 1, further including a cutting tray for supporting masonry materials to be cut, said cutting tray being supported in said dust pan for relative movement with respect to the cutting blade longitudinally of a cutting direction.

24. The apparatus of claim 20 further including a cutting tray for supporting masonry materials to be cut, said cutting tray being supported for relative movement with respect to the cutting blade longitudinally of a cutting direction.

25. The apparatus of claim 24, wherein said support means and wheel means are part of a cart assembly, said cart assembly being detachably secured to the lower frame assembly.

26. A portable masonry saw apparatus comprising:
an upper frame assembly;
a lower frame assembly secured to the upper frame assembly;
an engine for driving a cutting blade of the portable masonry saw apparatus secured to a mounting deck connected to the upper frame assembly;
an arbor for supporting a cutting blade;
said frame assembly, mounting deck and arbor being disposed in relatively fixed positions;
a cutting tray for supporting the material to be cut, said cutting tray being supported for relative movement with respect to the arbor and the blade longitudinally of a cutting direction;
dust removal means including conduit means extending down the, cutting path having a longitudinal slot through a top wall thereof for receiving dust from cutting of the workpiece; and
suction means connected to said conduit means for drawing the dust through the conduit to a dust collection device.

27. The apparatus of claim 26 wherein said dust removal means includes a dust pan detachably connected to the lower frame assembly, said dust pan having an upwardly facing dust collecting concavity.

28. The apparatus of claim 27, further including water support means for supplying water to the dust collecting concavity.

29. The apparatus of claim 15, wherein said cutting tray includes a longitudinal slot aligned with the slot in the conduit means.

30. The apparatus of claim 29 wherein said cutting tray has baffles on the underside thereof said baffles defining traverse chambers in communication with the slot in the conduit means.

31. A portable masonry saw apparatus comprising:

an upper frame assembly;

a lower frame assembly secured to the upper frame assembly;

an engine for driving a cutting blade of the portable masonry saw apparatus secured to a mounting deck connected to the upper frame assembly;

an arbor for supporting a cutting blade;

said frame assembly, mounting deck and arbor being disposed in relatively fixed positions;

a cutting tray for supporting the material to be cut, said cutting tray being supported for relative movement with respect to the arbor and the blade longitudinally of a cutting direction; and adjustable locking wings extending from the upper frame assembly at a rear end of the lower frame assembly for restraining the cutting tray from tipping.

* * * * *